(12) United States Patent
Singh

(10) Patent No.: US 8,417,683 B2
(45) Date of Patent: Apr. 9, 2013

(54) SYSTEM AND METHOD FOR PRESENTING GEOLOCATED RELEVANCE-BASED CONTENT

(75) Inventor: Vik Singh, San Jose, CA (US)

(73) Assignee: Yahoo ! Inc., Sunnyvale, CA (US)

( * ) Notice: Subject to any disclaimer, the term of this patent is extended or adjusted under 35 U.S.C. 154(b) by 265 days.

(21) Appl. No.: 12/706,410

(22) Filed: Feb. 16, 2010

(65) Prior Publication Data

US 2011/0202514 A1   Aug. 18, 2011

(51) Int. Cl.
 *G06F 17/30* (2006.01)
(52) U.S. Cl. ......... 707/706; 707/723; 707/754; 707/769
(58) Field of Classification Search .................. 707/706, 707/723, 754, 769
See application file for complete search history.

(56) References Cited

U.S. PATENT DOCUMENTS

| | | | |
|---|---|---|---|
| 8,055,282 B1* | 11/2011 | Ortega et al. | 455/465 |
| 8,069,182 B2* | 11/2011 | Pieper | 707/769 |
| 2009/0144260 A1* | 6/2009 | Bennett et al. | 707/5 |
| 2010/0082598 A1* | 4/2010 | Steelberg et al. | 707/710 |
| 2010/0306200 A1* | 12/2010 | Frank et al. | 707/741 |
| 2011/0010336 A1* | 1/2011 | Johnson et al. | 707/609 |
| 2011/0087685 A1* | 4/2011 | Lin et al. | 707/765 |
| 2011/0137881 A1* | 6/2011 | Cheng et al. | 707/706 |

\* cited by examiner

*Primary Examiner* — John E Breene
*Assistant Examiner* — Andalib Lodhi
(74) *Attorney, Agent, or Firm* — SNR Denton US LLP

(57) ABSTRACT

The present invention provides for a computerized method and system for presenting geolocated relevance-based content including determining a geographic location of a mobile processing device and identifying a plurality of search queries associated with the geographic location of the mobile processing device. The computerized method and system further includes generating at least one search result responsive to at least one of the plurality of queries associated with the geographic location of the mobile processing device. Therefore, in the method and system, the mobile processing device is presented with one or more search results based on the geographic location of the mobile processing device.

17 Claims, 5 Drawing Sheets

SYSTEM AND METHOD FOR PRESENTING GEOLOCATED RELEVANCE-BASED CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to the search and presentation of content. More specifically, the present invention provides systems, methods and computer program products for searching and presenting geolocated relevance-based content to users utilizing mobile devices.

BACKGROUND OF THE INVENTION

The World Wide Web provides access to an extraordinary large collection of informational resources (in various formats including text, images, videos, other media content and combinations thereof) relating to virtually every subject imaginable. Current search technologies allow a user to enter a search query and are operative to return a plurality of search result matches to a user. The existing structure of a search result page usually consists of a listing of the search results corresponding to the search query, which a search engine may present in conjunction with extraneous elements such as advertising links, links to other services of the search engine, etc.

However, as these information resources available on the World Wide Web become further accessible to an increasing list of access devices, specifically mobile devices with web browser capabilities such as smartphones, PDAs, notebooks and netbooks, the retrieval of these information resources through the current search technology of submitting a search query is a time consuming process. Not only are users restricted by the limitations of such access devices, such as smaller peripheral components (e.g., smaller and/or less responsive keyboard) or slower transfer speeds, these users are typically in motion, having limited time to submit a search query and consistently changing the search parameters for the information which they are seeking It is becoming almost ubiquitous that mobile devices include global positioning capabilities. As this global positioning information is now usable by the processing device, for example in a mapping application, it is equally usable for other operations. Often times this global position information can be presented to a base station or central processing component, but user information sharing restrictions prevent the amount of sharing or utilization of this information.

As the growth of the use of mobile devices for operations beyond mere voice communications, e.g. telephone calls, there are needs for increasing the speed and efficiency of these operations, such as a search operation. There are no current techniques for coupling global positioning information with searching operations in mobile device. The limited data transfer capacity for wireless or cellular technology also limits the effectiveness of these mobile processing devices and subsequent processing systems. Therefore, there exists a need for converging global positioning information with user search operations in a mobile processing device to improve user experience and optimize processing operations.

SUMMARY OF THE INVENTION

The present invention provides for a computerized method and system for presenting geolocated relevance-based content including determining a geographic location of a mobile processing device and identifying a plurality of search queries associated with the geographic location of the mobile processing device. The computerized method and system further includes generating at least one search result responsive to at least one of the plurality of queries associated with the geographic location of the mobile processing device. Therefore, in the method and system, the mobile processing device is presented with one or more search results based on the geographic location of the mobile processing device.

In various embodiments, the computerized method and processing system allows for the automated disposition of estimated search results to a user based solely on the user's location. When the user launches a search engine application, prior to receipt of a search request, the computerized method and system estimates the search query based on a popularity of recent searches, including for example presenting to the user the most-popular search results. Based on the geographic location, the computerized method and system predicts the user's search request and presents predicted results. Whereupon, the user can additionally enter search terms if the popular search results are not the intended content.

In addition to estimating search results, the computerized method and system is also operative to populate a database tracking user searches. This tracking of user search activity is then usable for determining the popular searches predicted and pushed to the users upon application launch.

Whereby, the computerized method and system overcomes prior technique limitations by harnessing and utilizing global position information to augment search results and estimate and predict search requests based on user popularity to push content in a more efficient technique over receiving a search term request and responding thereto.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
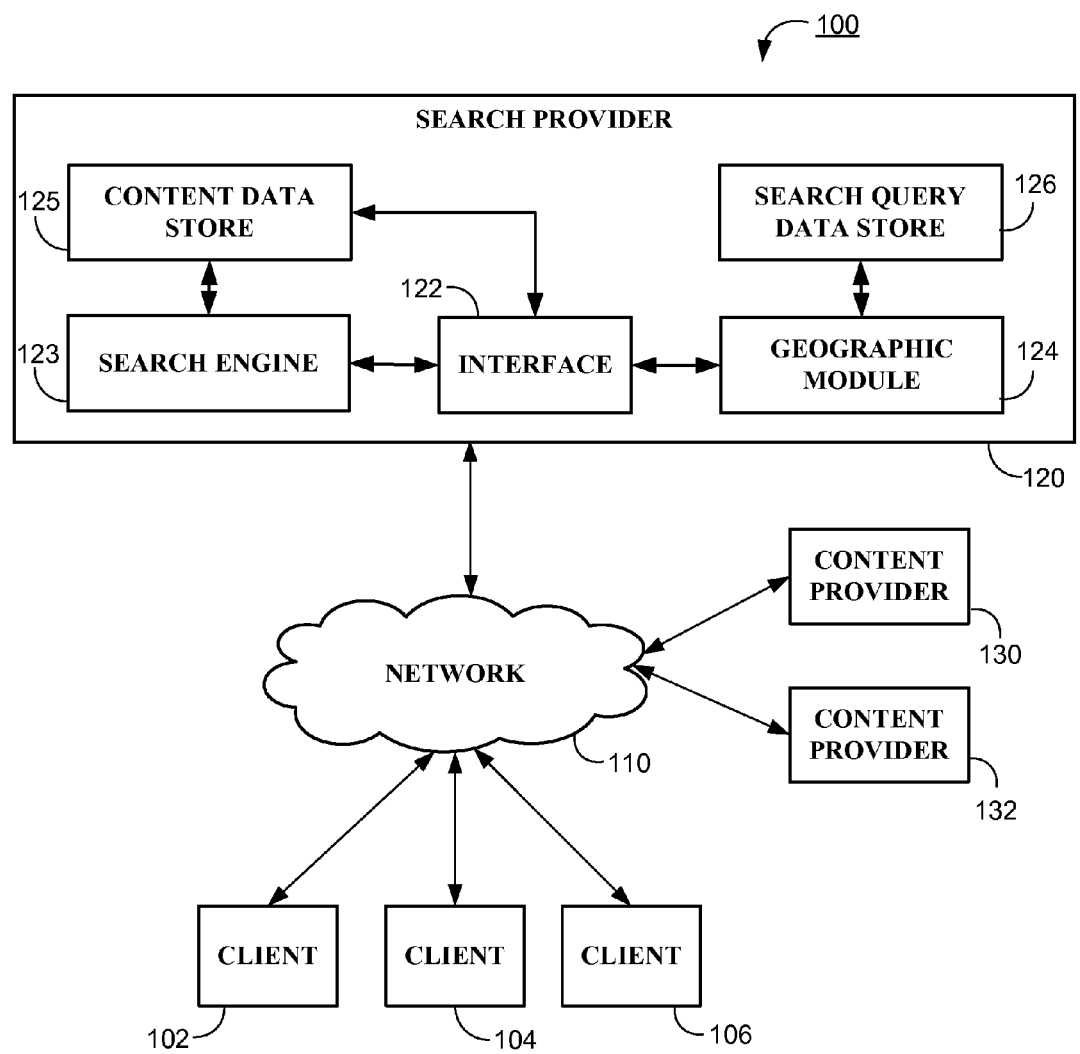
FIG. 1 illustrates one embodiment of a block diagram of a system for populating a query log database in order to present geolocated relevance-based content.

FIG. 1 illustrates one embodiment of a system 100 for generating and presenting geolocated relevance-based content. The system 100 is operative for both predictive distribution of search results to a user and monitoring or tracking user search activities relative to geographic locations for database population, as described in further detail below.

The illustrated embodiment of the system 100 includes a computer network 110, a search provider 120, a first client 102, a second client 104 and a third client 106, a first content provider 130 and a second content provider 132. In the present embodiment, the search provider 120 includes an interface 122, a search engine 123, a geographic module 124, a content data store 125 and a search query data store 126.

The computer network 110 may be any type of computerized network capable of transferring data, such as the Internet. According to one embodiment of the invention, the first client device 102, the second client device 104 and the third client device 106 are mobile communication devices comprising a processor, transient and persistent storage devices, input/output subsystem and a communication subsystem to provide a communications path between components comprising the mobile communication device. Exemplary mobile communication devices considered to fall within the scope of the present invention include, but are not limited to, mobile personal computers, notebooks, netbooks, hand held devices, mobile handsets, data messaging devices, two-way pagers, wireless Internet appliances, data communication device, personal digital assistants (PDAs), wireless two-way e-mail communication devices, etc. While illustrated with three separate client devices, it is recognized that any suitable number of client devices may access this system from any number geographic locations.

According to one embodiment of the invention, the search provider 120 and the content providers 130 and 132 are programmable processor-based computer devices that include persistent and transient memory, as well as one or more network connection ports and associated hardware for transmitting and receiving data on the network 110. The search provider 120 and the content providers 130 and 132 may host websites, store data, serve ads, etc. Those of skill in the art understand that any number and type of the providers 120, 130 and 132 may be connected to the network 110.

The search engine 123 and the geographic module 124 may include one or more processing elements performing processing operations responsive to executable instructions, collectively as a single element or as various processing modules. The content data store 126 and the search query data store 128 may be one or more data storage devices of any suitable type that are operative to persistently store corresponding data therein.

In accordance with one embodiment, search provider 120, first client 102, second client 104, third client 106, first content provider 130 and second content provider 132 are communicatively coupled to the computer network 110. Client devices 102, 104 and 106, communicate across the network 110 to submit a search request to the search provider 120 for one or more web documents responsive to the specific keywords of the search query identified within in the search request. The client devices 102, 104 and 106 include global positioning information when accessing the network, that position information indicates the user's position, such as a physical address, longitude/latitude coordinate or any other suitable type of position information.

For example, an individual using the mobile processing (client) device 102 can be located in front of the Chrysler Building at 405 Lexington Avenue, New York, N.Y. The user may launch a web browser application and submit a search request for "lunch spots" or some similar term. According to one embodiment, the search provider 120 maintains the interface 122 through which the search request is not only submitted, but the search is conducted and results submitted back to the device 102.

Based on various embodiments, as described in further detail below, the mobile processing device can be automatically presented with predictive search results. For example, based on knowledge of the global position and other information, such as for example a time of day indicator or user profile information, the search engine 123 can determine the most popular search request at this location and predicatively present the user with those search results before the user asks. Using the above example of 405 Lexington Ave., if the tracking of search history indicates a trend for searching for lunch spots, restaurants, and/or delis at a particular time, when the application is launched, those search results may pushed directly to the client device 102 prior to requiring the user to enter the search request on the client device 102. Through the interface 122, the user is still able to enter a regular search request to the search engine 123 in the event the predictive search results are that which the user seeks.

According to one embodiment, upon receipt of the search request at the interface 122 of the search provider 120, the search engine 123 simultaneously receives the search request and retrieves one or more search results responsive to the query, for example in the form of web documents, such as a news website, an online shopping website, a blog website, etc. The search engine 123 may retrieve the search results from the content data store 125. According to another embodiment, the search engine 123 retrieves responsive search results from the content providers 132 and 133, via the network 110 via interface 122. The search engine 123 transmits the responsive search results back to the client device 102.

Consistent with search requests and result generation, the search provider 100 additionally tracks and stores the search information with at least the geographic information. As described in further detail below, additional information can be used to track or otherwise store the search information and results.

It is also recognized that the scope of the geographic limitation directly relates to the reliability of the predictability of results. If a small geographic scope is utilized, this can provide a higher degree of reliability of search information because this would infer a more concise sampling of information, such as for example the scope of several feet, meters, blocks, longitude/latitude degrees, etc. A larger scope may be, for example, a city block, which has a higher degree of variables for which users might be conducting search operations, therefore there is less reliability in the predictiveness.

With reference back to FIG. 1, in one embodiment, the geographic module 124 assigns a pointer for each of the responsive search results in the content data store 125 to the corresponding search query stored in the search query data store 126. The responsive search results and the corresponding pointer to the associated search query are stored in an index data structure within the content data store 125.

Figure 2:
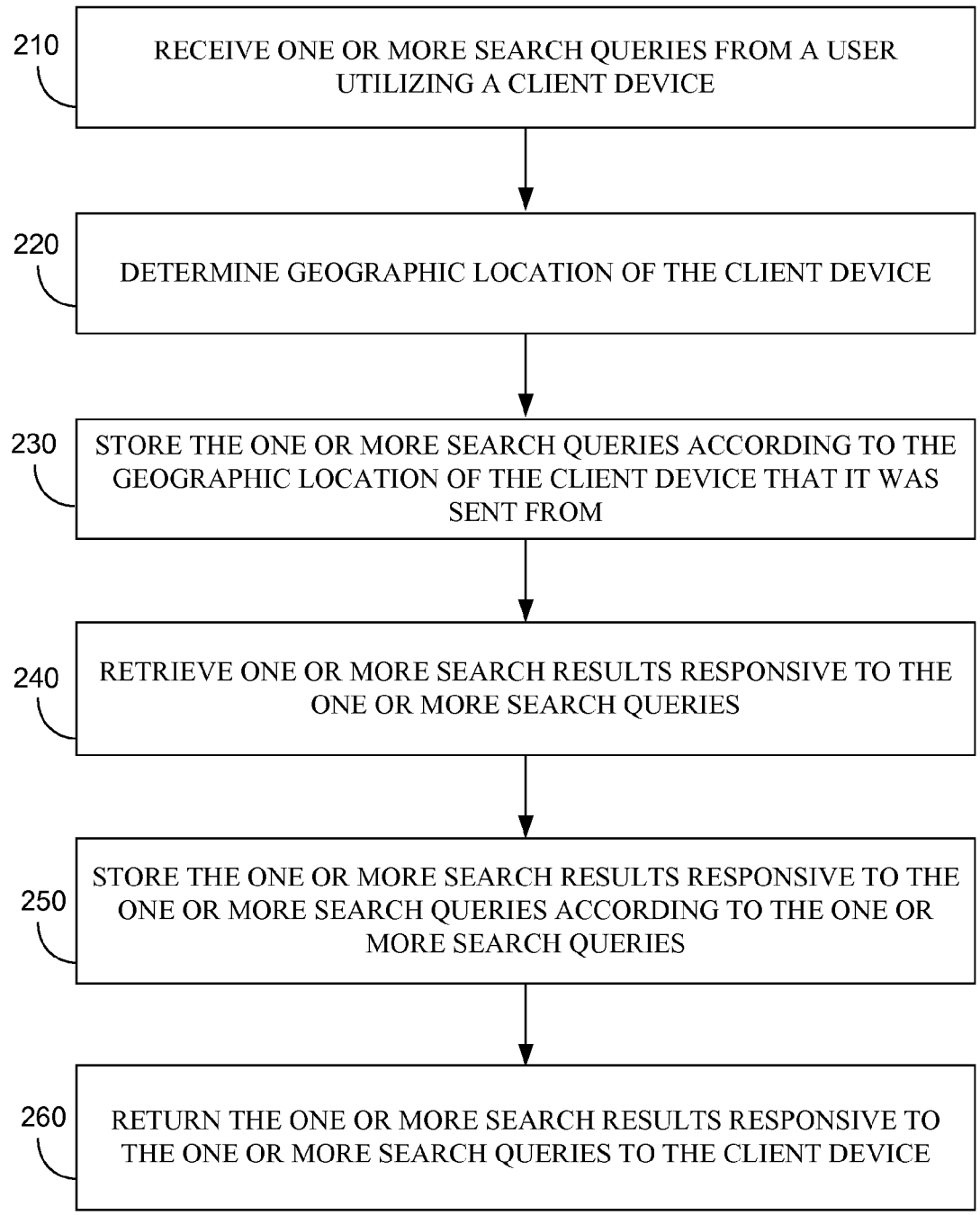
FIG. 2 illustrates a flow diagram presenting one embodiment of a method for populating a query log database in order to present geolocated relevance-based content.
Figure 3:
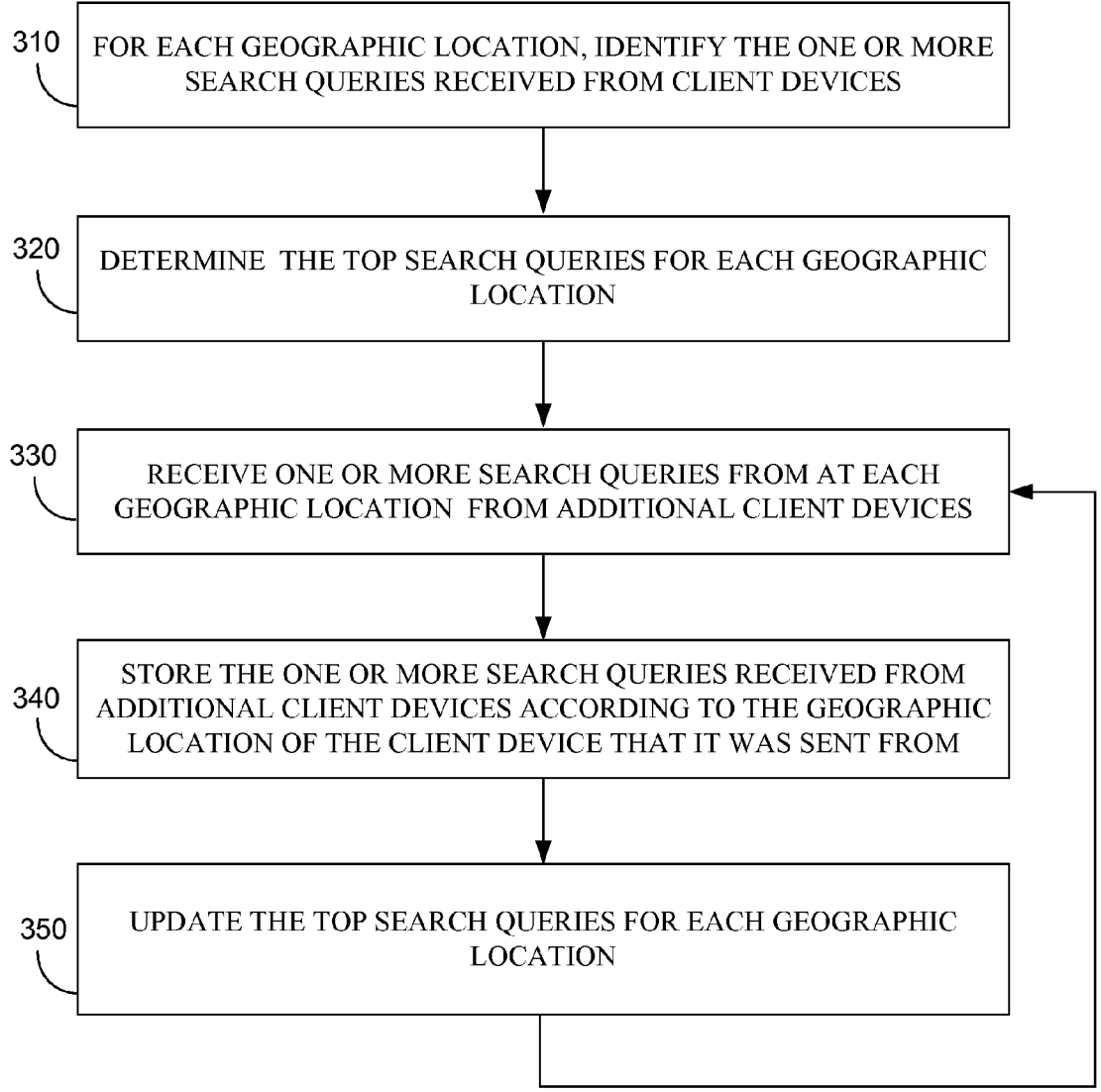
FIG. 3 illustrates a flow diagram presenting one embodiment of a method for determining the top search queries in the query log database in order to present geolocated relevance-based content.
Figure 4:
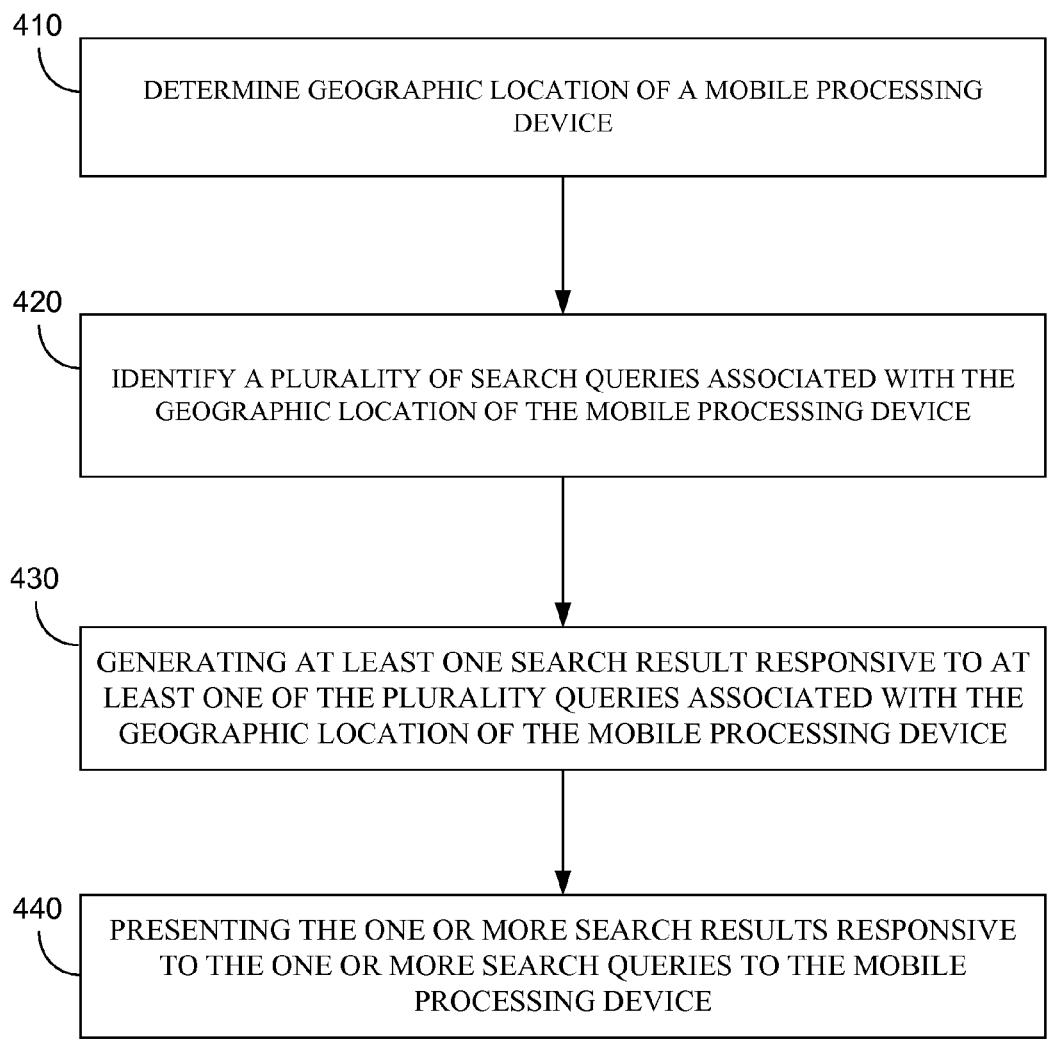
FIG. 4 illustrates a flow diagram presenting one embodiment of a method for searching and presenting geolocated relevance-based content.

As described in further detail in the flowcharts below, FIG. 2 illustrates the tracking and population of the search query data store. FIG. 3 illustrates the ranking of search requests and search terms for the predictive push of search results. FIG. 4 illustrates the automated distribution or push of predictive search results to the user.

FIG. 2 illustrates one embodiment of a flow diagram for a method for populating a query log database in order to present geolocated relevance-based content. In accordance with the embodiment of FIG. 2, the method may begin by receiving one or more search queries from a user utilizing a client device, step 210. For example, an individual using a mobile handset equipped with web browser capabilities may be standing in front of Grand Central Terminal in New York, N.Y. and may access the web browser in order to submit a search query for "lunch spots in midtown manhattan"

The geographic location of the client device is then determined, step 220. Continuing from the previous example, a geographic module determines that the search query was received from the address, 87 East $42^{nd}$ Street, New York, N.Y., using commonly known global positioning technology. It is recognized that the client device may also use a global positioning system (GPS) device and mark the location with a longitude/latitude identifier, or any other suitable type of information.

The one or more search queries are stored according to the geographic location of the client device from which it was sent from, step 230. For example, the search query "lunch spots in midtown manhattan" is stored in an index data structure in a data store, along with the corresponding location, 87 East $42^{nd}$ Street, New York, N.Y.

As described in further detail below, it is also recognized that additional information can be stored with the search request, including for example user information and/or environment information. For example, environment information may be information such as the time of day or current weather details. For example, user information may be user profile data, such as indicating the user is a certain age, within a certain demographics, has a preference for various items, e.g. instead of just lunch spots, the user is a vegetarian also.

One or more search results responsive to the one or more search queries are retrieved, step 240. Continuing from the previous example, the search result list may include a consumer review website offering reviews of different restaurants located in midtown Manhattan, a blog website wherein individuals that work in the vicinity discuss the cheapest places to buy lunch or a website for steakhouse restaurants located in the vicinity. The one or more search results responsive to the one or more search queries are then stored according to the one or more search queries as referenced by the geographic information, step 250. For example, the geographic module 124 of FIG. 1 assigns a pointer for the consumer review website offering reviews of different restaurants located in midtown Manhattan stored in an index structure in a content data store, which points to the search query "lunch spots in midtown manhattan" stored in a search query data store. The one or more search results responsive to the one or more search queries are then returned to and displayed on the client device, step 260 and the process flow then terminates.

Thereby, through the method of FIG. 2, the search query data store 126 of FIG. 1 is populated with user search request data. This data tracks user search operations, including search terms, based on the geographical location from whence the search request is initiated, e.g. the physical position of the mobile processing device, as referred to as the client device 102, 104 and/or 106. In additional embodiments, the search query data store 126 further includes the ancillary or additional information associated with the search queries.

FIG. 3 illustrates one embodiment of a flow diagram presenting a method for determining the top search queries in the query log database in order to present geolocated relevance-based content. In one embodiment, this method may be performed just-in-time with available processing capabilities, or in another embodiment may be performed on a regular interval in back-end processing operations. The method includes defining a geographic location, step 310. For example, the geographic module 124 of FIG. 1 is operative to select a given location that is stored in a search query data store, such as 87 East $42^{nd}$ Street, New York, N.Y., or could be longitude/latitude data, the method identifies search queries received from the location, such as the examples of: "lunch spots in midtown manhattan," "landmarks near Grand Central Station," "churches in midtown manhattan" "clothing stores in Grand Central terminal." The method determines the top search queries for each geographic location, step 320. Continuing from the previous example, the geographic module 124 of FIG. 1 can determine the top search queries for the location 87 East $42^{nd}$ Street, New York, N.Y., by tabulating the popularity of the various queries. Based on this tabulation, the geographic module may determine that the search query "lunch spots in midtown manhattan" is the top search query and that the search query "clothing stores in Grand Central terminal" is the second most received query for this particular location. This location information and associated search queries are stored in the search query data store 132 of FIG. 1.

The further steps of FIG. 3 illustrate the iterative nature of this process. As additionally search requests come in, the ranking and hence popularity is similarly adjusted. It is additionally noted that the flowchart of FIG. 3 relates exclusively to actually submitted search requests. Whereas, as noted in FIG. 4, when the predictive search results are what the user is seeking, no search is then conducted. As this new search is not conducted, there is the possibility of this search result not being counted for popularity purposes because the user does not actually submit the search terms. Therefore, in one embodiment, when a predictive search term is proposed to a user and a search request is not received in return, the system may count the predicted search terms as another iteration of a search request, the implication being that because the user did not submit a new search request, the predictive terms correctly predicted the user's search request.

Additional search queries are received, step 330. For example, another user located at 87 East $42^{nd}$ Street, New York, N.Y. may use his mobile device and access its web browser to the submit the search queries "landmarks near Grand Central Station" and "five star hotels in midtown manhattan." The one or more additional search queries received from the additional client devices are stored according to the geographic location of the client device from which it was sent from, step 340. The top search queries for each geographic location are then updated, step 350.

Continuing from the previous example, the search queries "landmarks near Grand Central Station" and "five star hotels in midtown manhattan" are stored in an index data structure and associated with the location, 87 East $42^{nd}$ Street, New York, N.Y. The geographic module is then operative to update the top search queries by performing a new tabulation for each of the search queries associated with the location, 87 East $42^{nd}$ Street, New York, N.Y. The new tabulation may then alter the ranking of the top search queries, where for example, based on the fact that an additional user submitted a search query, "landmarks near Grand Central Station" at the location, the search query "clothing stores in Grand Central terminal" becomes the third most received query for the location and the "landmarks near Grand Central Station" becomes the second most received query. Process flow then reverts back to step 330, where a continuous update is performed as to the top search queries for a given location.

FIG. 2 describes the tracking of this search request information and geographic information. FIG. 3 describes the ranking or popularity determination of the search request information. FIG. 4 illustrates a flow diagram presenting one embodiment of a method for presenting geolocated relevance-based content. A first step in this embodiment is to determine a geographic location of the mobile processing device, step 410. With reference to FIG. 1, this includes the mobile processing device (client device) 102 recognizing its location using any suitable technique and providing that location information to the search provider 123. It is recognized that privacy restrictions can complicate this step, including a perfunctory or required user-permission request for sharing or distributing the user's location information, therefore, one embodiment may include receiving user permission prior to determining the geographic location.

A next step, step 420 is identifying a plurality of search queries associated with the geographic location of the mobile processing device. As described above in FIG. 3, the search queries can be ranked by one or more factors. The identification step may include accessing an already-ranked list of queries or performing a ranking in a just-in-time fashion. Using the geographic information, whether it be an address, a longitude/latitude coordinate or any other type of information, the method includes referencing the database of associated search queries to identify the one or more search queries.

A next step, step 430, is generating at least one search result response to at least one of the plurality of queries associated with the geographic location of the mobile processing device. This step may include accessing a database of pre-saved search results from earlier executed search operations. This step may include using the search query terms and generating a contemporaneous set of search results.

Whereby, the final step, step 440, in this embodiment, is then presenting the one or more search results responsive to the one or more search queries directly to the mobile processing device. This step may include presenting this one or more search results prior to the user entering any search request, whereby the presented search results are predictive results. For example, on the mobile processing device, the user might launch an application or a web browser and seek to utilize a search engine.

When the mobile device makes that initial connection with the search engine, the search engine may use the geographic location information to thereby predict the user's search request and present those search results back to the user without requiring the user to enter the search terms. The user may be presented with the search results and a search toolbar whereby if the predicted results are not the intended results, the user can easily and readily enter a new search, consistent with techniques the user would encounter if the predictive search results were never presented. The search queries are ranking and predicted based on tracking of user search behaviors relative to the determined location.

In another embodiment, the user may be presented with a dual option interface, including the option to automatically receive the most popular search results for a particular location or simply receive a search toolbar for entering a search request. In additional embodiments, the geographic location can be utilized to influence term suggestion operations using predictive search term techniques for when the user first enters the search term.

The ranking and predicting can also be tempered by additional processing operations, such as filtering the tracking information based on environmental factors. For example, if a particular location is determined to be a hotel, filtering may be utilized to distinguish between people randomly surfing on their mobile processing devices and time-sensitive search operations. A time sensitive searching operation may be a time of day and a person looking for a particular result, this predictive technique can predict the person is looking for a restaurant for example, but if random activity is performed at a particular location, filtering operations can be utilized to reduce extraneous noise. In one example, machine-learning techniques can be utilized to determine and filter seemingly random searching activities that might indicate a non-time sensitive operation, just by of example searching for a newspaper article or online web log in a hotel lobby.

Another feature used for filtering or otherwise predicting search results can be environmental or external information. For example, if the user authorized sharing of information, the user's personal preference can be utilized to help track and otherwise filter the search information. This additional information provides an additional computational factor for determining popularity. Environmental information may indicate that a particular location requires additional filtering, such as noting that a particular location has multiple stories, so a search at one elevation may be different from another elevation. It is recognized that other types of information for filtering can be utilized, the listed examples are for illustration purposes only and not meant to be expressly limiting.

Figure 5:
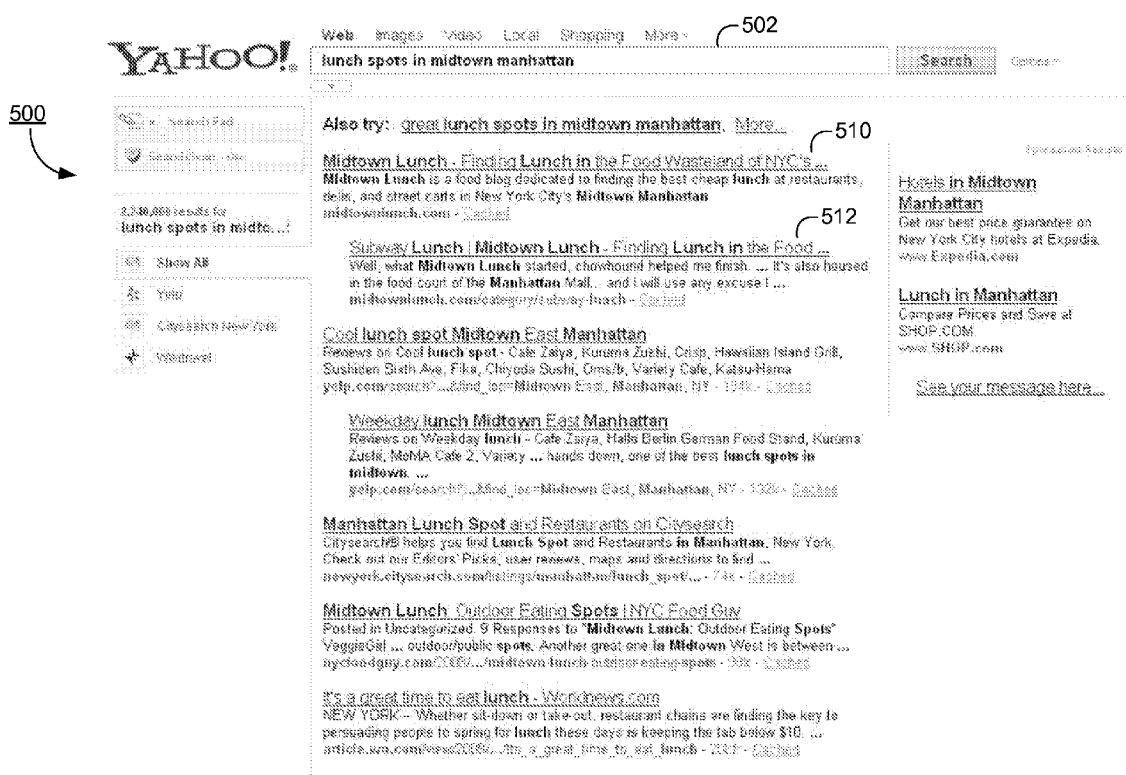
FIG. 5 illustrates a sample screenshot of a search results page presenting geolocated relevance-based content.

FIG. 5 illustrates a sample screenshot of a search results page presenting geolocated relevance-based content according to one embodiment of the present invention. Continuing from the previous example, FIG. 5 lists one or more search results responsive to the search query "lunch spots in midtown Manhattan," 510 and 512. According to one embodiment, the search results 510 and 512 are presented to a user who accesses the user interface of the search provider based on top search query associated with the user's geographic location, which is automatically populated in the search field of the user interface, 502. According to another embodiment, the search results 510 and 512 are presented to a user who accesses the user interface of the search provider based on the top search query associated with the user's geographic location without reference to the top search query, presenting the user with relevant content based on the user's geographic location.

Thereby, through the present method and system, the user can receive predictive search results based on the user's location. The back-end system can monitor and track search queries for locations and thereby uses this information for predicting or estimating the most likely user search request. If it is recognized that at a particular location, the most popular search request is for the same thing, the present method and system improves processing efficiency by presenting users with this information without having to be asked. Thereby, the present system and method improves processing efficiencies and searching capabilities by accounting for geographic locations of mobile processing devices performing searching operations.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed:

1. A computerized method for presenting geolocated relevance-based content, the method comprising:

determining a geographic location of a mobile processing device;

determining the scope of the geographic location;

identifying a plurality of top search queries associated with the geographic location of the mobile processing device, the top search queries based at least on a trend associated with search queries within the scope of the geographic location;

utilizing at least one environmental factor for determining whether filtering is to be applied at the geographic location;

based on the at least one environmental factor, filtering tracking information at the geographic location to distinguish between time sensitive search operations and non-time sensitive search operations;

generating at least one search result responsive to at least one of the plurality of top search queries associated with the geographic location of the mobile processing device; and presenting the one or more search results responsive to the one or more top search queries to the mobile processing device without a user of the mobile processing device entering a search request, wherein the presented search results are predictive results.

2. The method of claim 1 further comprising:

presenting the one or more search results to the mobile processing device after a user activates a search engine interface but before the user enters a search term.

3. The method of claim 1 further comprising:

tracking user search requests at a search engine based on the geographic location of the mobile processing device performing the search request.

4. The method of claim 3 further comprising:

ranking the user search requests by frequency; and identifying the plurality of search queries associated with the geographic location of the mobile processing device based on the ranking of the user search requests.

5. The method of claim 3 further comprising:

tracking ancillary information, in addition to the geographic location, of the mobile processing device and the user search request.

6. The method of claim 1, wherein the determining the geographic location of the mobile processing device is based on global positioning information provided from the mobile processing device.

7. A system for presenting geolocated relevance-based content, the system comprising:

a non-transitory computer readable medium having executable instructions stored thereon; and a processing device, in response to the executable instructions, operative to:

determine a geographic location of a mobile processing device;

determine the scope of the geographic location;

identify a plurality of top search queries associated with the geographic location of the mobile processing device, the top search queries based at least on a trend associated with search queries within the scope of the geographic location;

utilize at least one environmental factor for determining whether filtering is to be applied at the geographic location;

filter tracking information at the geographic location to distinguish between time sensitive search operations and non-time sensitive search operations based on the at least one environmental factor;

generate at least one search result responsive to at least one of the plurality of top search queries associated with the geographic location of the mobile processing device; and present the one or more search results responsive to the one or more search queries to the mobile processing device without a user of the mobile processing device entering a search request, wherein the presented search results are predictive results.

8. The system of claim 7, the processing device further operative to:

present the one or more search results to the mobile processing device after a user activates a search engine interface but before the user enters a search term.

9. The system of claim 7, the processing device further operative to:

track user search requests at a search engine based on the geographic location of the mobile processing device performing the search request.

10. The system of claim 9, the processing device further operative to:

rank the user search requests by frequency; and identify the plurality of search queries associated with the geographic location of the mobile processing device based on the ranking of the user search requests.

11. The system of claim 9, the processing device further operative to:

track ancillary information, in addition to the geographic location, of the mobile processing device and the user search request.

12. The system of claim 7, wherein the determining the geographic location of the mobile processing device is based on global positioning information provided from the mobile processing device.

13. A non-transitory computer readable medium having executable instructions stored thereon that when executed provide a computerized method for presenting geolocated relevance-based content, the method comprising:

determining a geographic location of a mobile processing device;

determining the scope of the geographic location;

identifying a plurality of top search queries associated with the geographic location of the mobile processing device, the top search queries based at least on a trend associated with search queries within the scope of the geographic location;

utilizing at least one environmental factor for determining whether filtering is to be applied at the geographic location;

based on the at least one environmental factor, filtering tracking information at the geographic location to distinguish between time sensitive search operations and non-time sensitive search operations;

generating at least one search result responsive to at least one of the plurality of top search queries associated with the geographic location of the mobile processing device; and presenting the one or more search results responsive to the one or more top search queries to the mobile processing device without a user of the mobile processing device entering a search request, wherein the presented search results are predictive results.

14. The computer readable medium of claim 13 further comprising:

computer readable medium for presenting the one or more search results to the mobile processing device after a user activates a search engine interface but before the user enters a search term.

15. The computer readable medium of claim 13 further comprising:

computer readable medium for tracking user search requests at a search engine based on the geographic location of the mobile processing device performing the search request.

16. The computer readable medium of claim 15 further comprising:

computer readable medium for ranking the user search requests by frequency; and computer readable medium for identifying the plurality of search queries associated with the geographic location of the mobile processing device based on the ranking of the user search requests.

17. The computer readable medium of claim 15 further comprising:

computer readable medium for tracking ancillary information, in addition to the geographic location, of the mobile processing device and the user search request.

* * * * *